(12) United States Patent
O'Keeffe et al.

(10) Patent No.: US 11,455,647 B2
(45) Date of Patent: *Sep. 27, 2022

(54) METHOD AND SYSTEM FOR PRESENTING INFORMATION FOR A GEOGRAPHICALLY ELIGIBLE SET OF AUTOMOBILE DEALERSHIPS RANKED BASED ON LIKELIHOOD SCORES

(71) Applicant: TrueCar, Inc., Santa Monica, CA (US)

(72) Inventors: Christopher James O'Keeffe, Oak Park, CA (US); Michael D. Swinson, Santa Monica, CA (US); Ludovica Rizzo, Los Angeles, CA (US); Daniel Salazar, Round Rock, TX (US)

(73) Assignee: TrueCar, Inc., Santa Monica, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/129,716

(22) Filed: Dec. 21, 2020

(65) Prior Publication Data

US 2021/0110418 A1    Apr. 15, 2021

Related U.S. Application Data

(63) Continuation of application No. 16/054,808, filed on Aug. 3, 2018, now Pat. No. 10,878,435.

(51) Int. Cl.
*G06Q 30/02* (2012.01)
*G06Q 10/08* (2012.01)
(Continued)

(52) U.S. Cl.
CPC ....... *G06Q 30/0206* (2013.01); *G06F 16/958* (2019.01); *G06Q 10/087* (2013.01);
(Continued)

(58) Field of Classification Search
CPC .. G06F 16/9535; G06F 16/735; G06F 16/248; G06F 16/335; G06F 16/24578;
(Continued)

(56) References Cited

U.S. PATENT DOCUMENTS 6,728,706 B2 *   4/2004   Aggarwal .............. G06Q 30/02
                                                707/999.005
7,246,110 B1 *   7/2007   Musgrove .......... G06Q 30/0601
                                                       705/28
(Continued)

*Primary Examiner* — Scott L Jarrett
(74) *Attorney, Agent, or Firm* — Sprinkle IP Law Group

(57) ABSTRACT

Systems, methods and computer program products for selecting dealers based on characteristics of the dealers and the user. A vehicle data system collects dealer location and historical transaction data from external data sources and generates and stores an eligibility table that identifies a set of eligible dealers for each combination of user location and vehicle make. Eligible dealers are determined from the eligibility table using a location and vehicle make identified from a user request. Scores are determined for each eligible dealer based on a dealer scoring model using a binary choice model in the form of a logistic regression of market share, inventory, close rate, price and distance, and dealers are ranked by these scores. A presentation of dealers selected by rank and by closest location to the user is generated and provided to the user via an interface running on a computing device.

20 Claims, 6 Drawing Sheets

(51) Int. Cl.
    *G06Q 30/06*     (2012.01)
    *G06F 16/958*     (2019.01)

(52) U.S. Cl.
    CPC ..... *G06Q 30/0203* (2013.01); *G06Q 30/0205* (2013.01); *G06Q 30/0601* (2013.01)

(58) Field of Classification Search
    CPC ........... G06Q 30/0629; G06Q 30/0256; G06Q 30/0641; G06Q 30/02; G06Q 30/0623; G06Q 30/0631
    See application file for complete search history.

(56) References Cited

U.S. PATENT DOCUMENTS

| | | | | |
|---|---|---|---|---|
| 7,426,481 | B1* | 9/2008 | Connors | G06Q 30/0625 |
| | | | | 705/26.5 |
| 7,725,477 | B2* | 5/2010 | Wiseman | G06F 16/9535 |
| | | | | 715/733 |
| 9,600,822 | B2* | 3/2017 | Pyle | G06Q 30/0643 |
| 10,127,591 | B1* | 11/2018 | Wollmer | G06Q 30/0603 |
| 10,600,105 | B1* | 3/2020 | Kumar | G06Q 30/0282 |
| 10,878,435 | B2* | 12/2020 | O'Keeffe | G06Q 30/0601 |
| 10,963,848 | B1* | 3/2021 | Anderson | G06Q 20/08 |
| 2002/0059253 | A1* | 5/2002 | Albazz | G06Q 10/10 |
| 2007/0156566 | A1* | 7/2007 | Nash | G06Q 30/0623 |
| | | | | 705/37 |
| 2009/0083130 | A1* | 3/2009 | Hall | G06Q 10/06375 |
| | | | | 705/7.31 |
| 2010/0293234 | A1* | 11/2010 | Schmidt | G06Q 30/0603 |
| | | | | 715/764 |
| 2012/0041846 | A1* | 2/2012 | Rehman | G06Q 30/06 |
| | | | | 705/26.1 |
| 2012/0158229 | A1* | 6/2012 | Schaefer | B60L 53/11 |
| | | | | 320/109 |
| 2012/0233035 | A1* | 9/2012 | Wilgus | G06Q 30/02 |
| | | | | 705/27.1 |
| 2013/0006916 | A1* | 1/2013 | McBride | G06Q 30/0629 |
| | | | | 706/52 |
| 2013/0304571 | A1* | 11/2013 | Swinson | G06Q 30/0277 |
| | | | | 705/14.54 |
| 2014/0067614 | A1* | 3/2014 | Hygema | G06Q 30/0601 |
| | | | | 705/26.63 |
| 2014/0136373 | A1* | 5/2014 | Kinsey, II | G06Q 30/0282 |
| | | | | 705/26.63 |
| 2018/0108058 | A1* | 4/2018 | Cotton | G06Q 30/01 |
| 2018/0189812 | A1* | 7/2018 | Swinson | G06Q 30/0201 |
| 2018/0338298 | A1* | 11/2018 | Pan | H04W 84/02 |
| 2019/0043071 | A1* | 2/2019 | O'Keeffe | G06F 16/958 |

* cited by examiner

Price Certificate: 2382123679
Your price is protected at these dealerships below.
Take this printed Price Certificate to the dealership and pick up your vehicle. *You're never obligated to make a purchase.*

---

Metro Ford - closest dealer
Learn More >>
510 ☑

23.5 miles from South Dartmouth, MA
1851 Newstate Hwy
Raynham, MA 02767
Get Directions >>
Contact Info
John Doe
(555) 555-5555
Send Email >>

STICKER PRICE: ~~$30,095~~
YOUR PRICE: $25,379

This dealer has agreed to price your deal relative to the Factory Invoice Price. Their offer is:

$3,500   Below Factory Invoice
         (Includes Incentives)

| | |
|---|---|
| Factory Invoice: | $28,879 |
| Dealer offer: | $-3,500 |
| Your Price: | $25,379 |

How your price works

Tip: All of these dealers have agreed to price their models relative to the Factory Invoice price.

Example:

Factory Invoice: $28,879
Dealer Offer:   $-3,501
Your Price:     $25,378

---

Tasca Auto RI
Learn More >>
520 ☑

28.7 miles from South Dartmouth, MA
1300 Pontiac Ave
Cranston, RI 02920
Get Directions >>
Contact Info
Jane Doe
(555) 123-4567
Send Email >>

STICKER PRICE: ~~$30,095~~
YOUR PRICE: $25,378

This dealer has agreed to price your deal relative to the Factory Invoice Price. Their offer is:

$3,501   Below Factory Invoice
         (Includes Incentives)

| | |
|---|---|
| Factory Invoice: | $28,879 |
| Dealer offer: | $-3,501 |
| Your Price: | $25,378 |

This dealer charges a $215 documentation fee.

- SANGRIA RED METALLIC
- CAMEL, CLOTH BACK FRONT SPORT BUCKET SEATS
- P25/70R16 ALL SEASON OWL TIRES

Incentives (Included)
- $2,000 CUSTOMER INCENTIVE (EXPIRES ON 2011-04-04)
- $1,000 CUSTOMER BONUS CASH (EXPIRES ON 2011-04-04)

---

Colonial Ford
Learn More >>
530 ☑

25.0 miles from South Dartmouth, MA
147 samoset ST
Plymouth, MA 02360
Get Directions >>
Contact Info
Bob Smith
(555) 789-1234
Send Email >>
Benefits
Express Checkout Available!
Free Local Delivery!

STICKER PRICE: ~~$30,095~~
YOUR PRICE: $25,379

This dealer has agreed to price your deal relative to the Factory Invoice Price. Their offer is:

$3,000   Below Factory Invoice
         (Includes Incentives)

| | |
|---|---|
| Factory Invoice: | $28,879 |
| Dealer offer: | $-3,500 |
| Your Price: | $25,379 |

This dealer charges a $279 documentation fee.

FIG. 6

TrueCar

The Target Price for the Atlanta, GA area is $21,819. —630
Select your preferred TrueCar Certified Dealers to receive your dealer price.

Your TrueCar Certified Dealers    Learn More

☑ TrueCar Dealer          Dealer Will Provide Price
   21.1 miles

☑ TrueCar Dealer          Dealer Will Provide Price
   19.0 miles

☑ TrueCar Dealer          Dealer Will Provide Price
   29.0 miles

620

Get Prices from TrueCar Certified Dealers

First Name
Last Name
Street Address
City/State/ZIP   Atlanta    GA    30329
Email
Phone Number

[Contact TrueCar Certified Dealers]

By clicking "Contact TrueCar
Certified Dealers", you agree that
TrueCar may share your contact
information with automobile dealers
associated with TrueCar. Please
review TrueCar's Privacy Policy
for further information on our data
collection and use practices.

610

600

METHOD AND SYSTEM FOR PRESENTING INFORMATION FOR A GEOGRAPHICALLY ELIGIBLE SET OF AUTOMOBILE DEALERSHIPS RANKED BASED ON LIKELIHOOD SCORES

CROSS-REFERENCE TO RELATED APPLICATIONS

This application is a continuation of, and claims a benefit of priority under 35 U.S.C. 120 from, U.S. patent application Ser. No. 16/054,808, filed Aug. 3, 2018, issued as U.S. Pat. No. 10,878,435, entitled "METHOD AND SYSTEM FOR PRESENTING INFORMATION FOR A GEOGRAPHICALLY ELIGIBLE SET OF AUTOMOBILE DEALERSHIPS RANKED BASED ON LIKELIHOOD SCORES," which is a conversion of, and claims a benefit of priority from U.S. Provisional Application No. 62/541,557, filed Aug. 4, 2017, entitled "METHOD AND SYSTEM FOR SELECTION, FILTERING OR PRESENTATION OF AVAILABLE SALES OUTLETS IN A DISTRIBUTED NETWORKED COMPUTING ENVIRONMENT USING SPATIAL AND GEOGRAPHY BASED METRICS," all of which are fully incorporated by reference herein.

TECHNICAL FIELD

This disclosure relates generally to the presentation of sales outlets (also known as dealers) to a user of website in a distributed computer network environment. In particular, this disclosure relates to the selection, filtering and/or presentation of dealers, taking into account user characteristics as well as characteristics of such dealers. Even more specifically, the present disclosure is related to optimizing the matching of users to a dealer based on the likelihood of the user purchasing a thing of value such as an automobile from the dealer.

BACKGROUND

Consumers are becoming savvier. This is especially true in the context of online purchasing, where research is easily accomplished. Consumers have therefore taken to searching for products or sales outlets (also referred to as vendors, sellers, dealers, etc.) online before executing a purchase. As the popularity of searching for products or dealers online before a consumer executes a purchase continues to grow, there is an increasing need to develop systems and methods for presenting candidate dealers based on a user's preference or characteristics of the user or dealer. However, when a user seeks a dealer from which he/she can make a purchase of a product (which may be an onsite purchase or an online purchase), the candidate dealers may have characteristics that may cause the user to prefer some dealers over others. In fact, certain characteristics may result in the likelihood of sale for some vendors to be small, negligible, or non-existent. Similarly, different features of a consumer may also result in a difference in the probability of the consumer buying from a particular vendor.

However, in the current realm of online commerce, effective systems and methods for the filtering, selection or presentation (collectively referred to as filtering) of dealers are lacking. Common approaches include listing all possible dealers (sometimes with an ability to sort by price, relevance, or other feature) or allowing the user to filter results by price, distance, or other product attribute. These approaches, however, typically push too much information to the user, who must then wade through this information with little guidance and with few tools. The user may therefore be overwhelmed by the task of examining the vast amount of data in search of one or two items having the desired characteristics.

Additionally, dealers also experience similar prioritization difficulties as they receive large numbers of leads that often overwhelm the resources available to pursue potential consumers. Conventional systems and methods often provide sales leads to dealers without regard to the quality of the leads. For example, dealers may receive a large number of leads, but many of those leads may have little or no value because they have little likelihood of being converted to sales (e.g., they may be leads for customers who are very distant from the dealer). To efficiently identify the consumers more likely to purchase the item in which they expressed interest, rather than those less likely to purchase, a procedure for ranking consumers may also be needed.

SUMMARY

Therefore, it is desired that systems and methods be provided which restrict the dealers that are presented to users, limiting the dealers to those with which the users have a high probability of occurrence of a successful sale. Likewise, it is desired that systems and methods be provided which restrict the leads that are presented to dealers to those for which the dealers have a high probability of occurrence of a successful sale. Such systems and methods increase the efficiency of online purchasing transactions by preventing resources from being wasted on potential transactions that have a low probability of a successful transaction as indicated by historical transaction data.

Systems and methods are there disclosed for the filtering, selection or presentation of vendors which account for both user characteristics and dealer characteristics, such that the systems and methods may be used by both consumers and dealers alike better match consumer needs with the resource-constrained vendors with whom a successful sale has a higher probability of occurring. It is also desired that systems and methods for the filtering, selection and presentation of vendors address the bilateral decision process by matching highly interested consumer(s) to the correct and best dealer(s) according to the features from both sides. (it should be noted that terms such as "vendor", "dealer", "seller", "sales outlets" and the like may be used interchangeably herein.)

Embodiments as disclosed herein may address these desires, among others, by utilizing a set of inputs such as pricing, proximity, historical performance, market share or close rate to predict the likelihood of a user purchasing a car from a dealer. Moreover, certain embodiments may use a dealer competition metric to refine or determine such data. The likelihood may be used to rank order the dealers of determine relative odds of completing the sale for dealers. Using such a predicted likelihood, dealers that may actually have a likelihood of selling a vehicle to a consumer may be accurately determined and presented to the user. Thus, based on embodiments, a user may be connected to a dealer based on the user's likelihood of purchasing from that seller. This allows both dealer and consumer to be evaluated according to a totality of the circumstances rather than individual factors alone, increasing the likelihood of a transaction occurring and reducing wasted time on both the users and dealers side.

Embodiments of systems and methods for the filtering, selection and/or presentation of vendors may (a) present a ranked list of candidate vendors sorted by the probability that a particular dealer will consummate a transaction with the consumer and (b) suppress presentation of those dealers that are unlikely to be selected by the consumer since their characteristics are less consistent with those needed by the consumer and, therefore, are unlikely to result in a sale. The same logic may be applied to dealers for selecting potential consumers as well. Therefore, this seeks to identify an accurate pairing of an online user and a dealer.

Embodiments as disclosed herein may have the advantages of taking into account a richer set of dealer and user attributes and leveraging empirically-based information to compute a probability of closing a sale and to identify those features which are most heavily considered during the buying decision process. In particular, certain embodiments may provide the advantages of:

1) Empirically determining the probability of sale using historical data, and
2) Not being limited to features related to distance, price, and historical sales activity by including, for example, additional factors like drive time, dealer density, available inventory, etc.

In particular, embodiments may offer the advantage of higher quality leads (or introductions) being provided to a seller as the determinations of which dealer to present to a user are made with increased accuracy. Specifically, better accuracy leads to higher quality introductions. The use of aggregated metrics also allows for a better overall prediction as it can take multiple components into account rather than looking only at one value at a time. Moreover, embodiments may move away from a rule based or standard number of dealer introductions. Specifically, by defining the result as a score (or, equivalently, a probability), the ability to vary the number of dealer introductions is obtained. For example, if a dealer has less than a 5% chance of "stealing" a sale from the closest dealer, then an introduction to that dealer (e.g., lead) may not be made. Alternatively, if more than a few dealers all have a chance, additional introductions may be made. Again, these advantages may improve the experience for both the dealer and the consumer as they may only get matched if there is a good chance of a sale. In addition, embodiments may have an improved ability to predict which dealers will get introduced to consumers. As current techniques are often based on only one metric, a slight change (say from $1 cheaper to $1 more expensive in price comparisons) to that value can cause dramatic swings to which introduction are made or the number of introductions. By using multiple metrics, this situation is much less likely to happen. Moreover, embodiments may be implemented in a more extensible framework. As more data are available, it is possible to factor those additional pieces of information into the determination of which dealers to present to a user.

One embodiment comprises a method for selecting dealers to present to a user via a vehicle data system based on characteristics of the dealers and the user. In this method, a vehicle data system embodied in a first computing device collects dealer location data and historical vehicle sales transaction data from external data sources that are communicatively connected to the computing device. The vehicle data system generates an eligibility table which contains data that identifies a set of eligible dealers for each combination of location and vehicle make. The eligibility table is stored in a memory that is communicatively connected to the computing device.

The vehicle data system generates a user interface and presents the interface to a user on a second computing device that is communicatively connected to the first computing device. The interface is adapted to enable the user to submit a user request to the vehicle data system, where the user request designates one or more vehicle characteristics and identifies a location associated with the user. When the vehicle data system receives a user request, it determines a set of eligible dealers corresponding to the user request by retrieving the eligibility table and identifying a set of eligible dealers corresponding to the user location identified by the user request.

For each of these eligible dealers, the vehicle data system determines a corresponding dealer score using a binary choice logistic regression model (e.g., using the Logit function) with variables that vary over the alternatives. Since the empirical data shows that most consumers prefer to buy from the closest dealer, the choice model is constructed as a contest between the closest dealer and a contender dealer. In other words, the choice becomes whether to buy from the closest dealer or from the competitor, with the closest dealer being preferred by default. With such a formulation, the variables of the model are a set of features that includes market share, inventory, close rate, price and distance. The model is expressed as $$(1+\exp(-\Sigma_{i=1}^{n}\beta_i\,(X_i^{closest}-X_i^{contender})))^{-1}$$

where i is an index of the dealer features, $\beta_i$ is a weighting coefficient for an $i^{th}$ feature, $X_i$ is a value for the $i^{th}$ feature and the superscript indicates whether the dealer is closest to some specific postal code or is a contender. The weighting coefficients are generated and stored in a memory prior to receiving the user request, and are retrieved and used to generate scores for the dealers quickly after the user request is received.

The vehicle data system ranks the eligible dealers based on the corresponding dealer scores. This ranking is used to select a subset of the eligible dealers (e.g., the top two or three ranked dealers) for presentation to the user in response to the user request. The vehicle data system may also select one or more dealers based on other considerations. In one embodiment, the system selects the top two ranked dealers, as well as the dealer that is closest to the user location identified by the user request. The vehicle data system generates a presentation that incorporates display components for each of the selected dealers and provides the presentation to the computing device on which the interface is running to update the interface.

Other embodiments may include systems and computer program products which embody the methods described above. Numerous other embodiments are also possible. These systems, methods, computer program products and the like are described in more detail below. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIGS. 3, 4 and 5 depict representations of screenshots utilized for presenting sales outlets; and FIG. 6 depicts a diagrammatic representation of a screenshot displayed on a client device.

DETAILED DESCRIPTION

Figure 1:
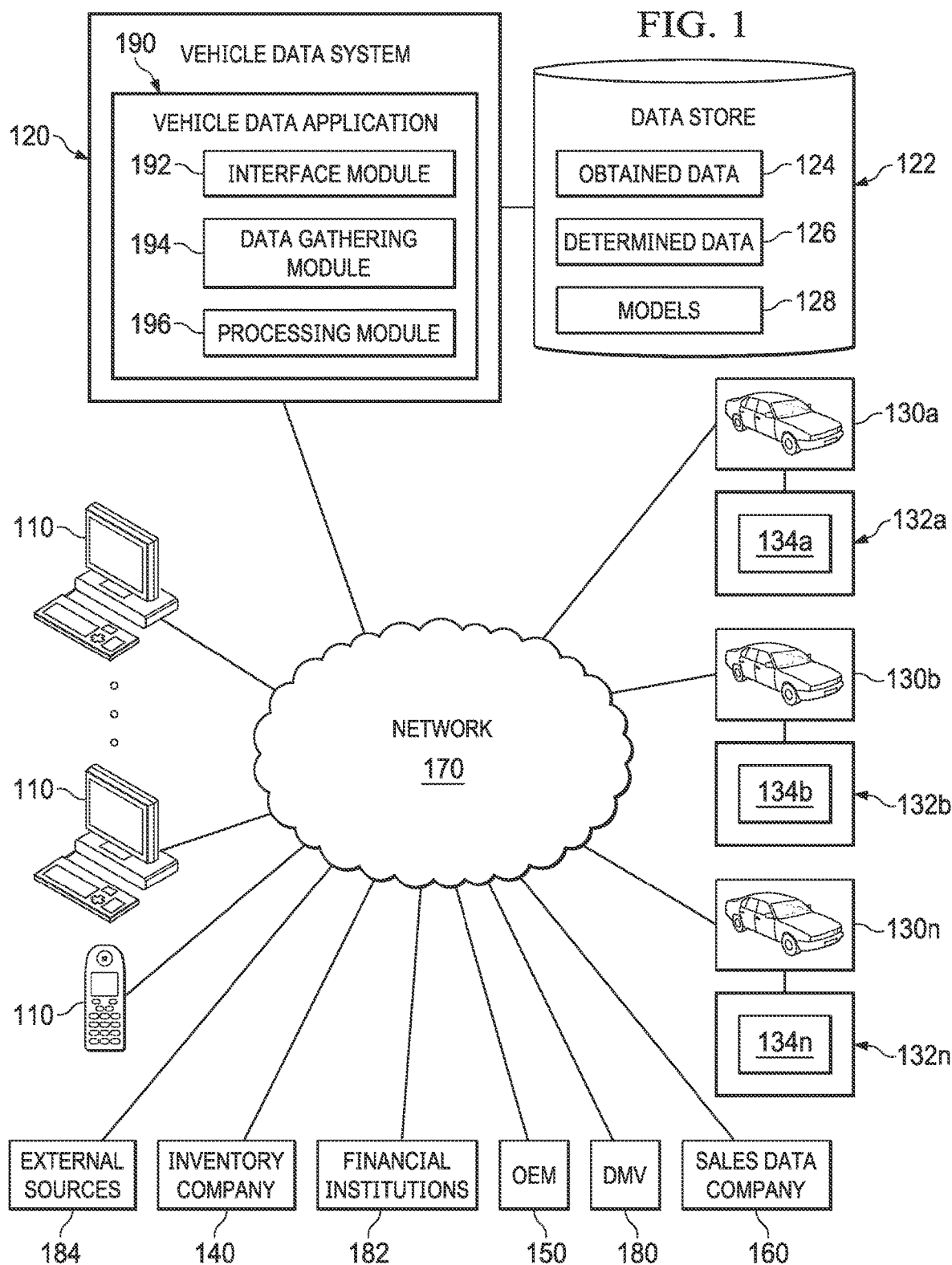
FIG. 1 is a diagrammatic representation of one example network architecture in which embodiments disclosed herein may be implemented.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk drive, flash drive or other memory), hardware circuitry or the like, or any combination.

Embodiments of the systems and methods disclosed herein may determine the probability (or likelihood) of a dealer "stealing" a sale from a dealer closest to a geographic area (e.g., a ZIP code in which a user lives or desires to purchase a vehicle) based on a set of features of a dealer. This probability may be used in the selection, filtering or presentation (collectively referred to as filtering herein) of dealers to a user through a one or more channels of a distributed computer network, such as a website.

For example, a logistic regression model or the like may be created to score a dealer based on data on the set of features collected from a number of sources in a distributed computer network. Such a logistic regression model may include a set of coefficients for each of a set of features ($\beta_i$) and an intercept ($\beta_0$). The scoring model is trained using data collected on the features from the sources in the distributed computer network, where the dependent variable for the linear regression model is a score reflective of the conditional probability that the dealer (d) will make a sale if given the lead and the independent variables are the set of features ($\beta_i$).

The scoring model thus takes the form:

$$(1+\exp(-\Sigma_{i=1}^{n}\beta_i (X_i^{closest} - X_i^{contender})))^{-1}$$

where i is an index of the dealer features.

It will be apparent that there is a wide variety of uses for such a model and algorithms. For example, in one embodiment, such models and algorithms can be used in a "Dealer Scoring Algorithm" (DSA), which can be used to select, filter or present vendors in response to a user-submitted search or user information. For example, after a user specifies his/her geographic location (e.g., ZIP Code or address) and desired product (e.g., make or model of vehicle), a set of eligible dealers may be identified based on the user's specified geography. In some embodiments, dealers may self-exclude or opt out of eligibility (e.g., a dealer may choose to be considered ineligible when the user is more than some predetermined distance from the dealer). The DSA can then be used to rank the eligible dealers and to select the dealers to present based on the ranking. The DSA could incorporate, for example, features such as historical performance, inventory features, and network features to get a probability of closing a sale to the user from a certain geographic area. Such a DSA may be used in a variety of customer contexts, in a variety of channels or with a variety of types of products or services.

In one embodiment, when a user location is determined (e.g., a user's ZIP code) a set of eligible dealers are determined, where each eligible dealer is characterized by a set of features, such as price (e.g., upfront price offered for a make/model of vehicle), close rate (e.g., number of sales divided by number of leads provided in certain time), market share (e.g., number of sales relative to overall sales for a make in a geographic area over a time period), existing inventory. In other words, each eligible dealer may have a value for each of the set of features, where the values are determined based on data associated with the dealer obtained from sources across the distributed computer network. In certain embodiments, to ensure that the values for a dealer for certain features (such as close rate or market share) are local, meaningful, and stable (which may be disparate or contradictory goals in some cases) fallback logic is implemented to determine data to utilize in the determination of the values for a dealer in the eligibility table for certain features. This fallback logic may be specific to the feature being evaluated and may employ a competition zone or competition zone score in determining the data to utilize in determining the value for the feature.

The binary choice model may be applied to the values for those features for each eligible dealer to generate a score for that dealer. The closest dealer (e.g., geographically or based on drive time, etc.) may be determined and a "likelihood to steal" determined for each eligible dealer (e.g., except for the closest dealer) using the score of the closest dealer and the score of the eligible dealer. This likelihood to steal may be used in the filtering of dealers to a user through a one or more channels of a distributed computer network. The likelihood to steal can be determined according to the equation:

$$Lik(d) = \frac{1}{1 + e^{-\beta_0 - (score_d - score_{closest})}}$$

where $\beta_0$ is the intercept of the model and $score_d$ and $score_{closest}$ are the score of dealer d and the closest dealer according to the dealer scoring model While embodiments of systems and methods may be usefully applied to the searching or purchasing of almost any product or service where purchases and searching is accomplished online or offline, embodiment may be especially useful in the context of online searching or purchasing of new cars. More specifically, in certain embodiments, such a DSA may be used to filter online searches for dealers. More particularly in certain embodiments, such a DSA may be used in the context of online car searching to filter online searches for new cars or dealers based on the score for the dealer or the likelihood to steal determined from the score.

For example, TrueCar (www.truecar.com) is an automotive website that provides competitive, upfront price quotes. Embodiments of the systems and method disclosed herein may be used by such a website in a dealer selection process to filter and present dealers (e.g., 3 selected dealers) that are most likely to yield a sale in response to a user-submitted upfront pricing search. In certain embodiments, only leads from customers with high probability of buying will be sent to the dealer. In this embodiment, a DSA may incorporate various dealer features such as dealer price, drive distance, drive time from dealer to customer ZIP code, historical performance (e.g., market share or close rate), dealer location, and inventory. Some rescaled variables may be further derived from dealer features to reflecting those characteristics compared to other candidate dealers.

It may be helpful here to give the context of the use of embodiments of systems and methods presented herein. It will be helpful to an understanding of these embodiments to review the methods and systems illustrated U.S. patent application Ser. No. 12/556,137, filed Sep. 9, 2009, entitled "SYSTEM AND METHOD FOR SALES GENERATION IN CONJUNCTION WITH A VEHICLE DATA SYSTEM", which is fully incorporated herein by reference in its entirety.

Figure 3:
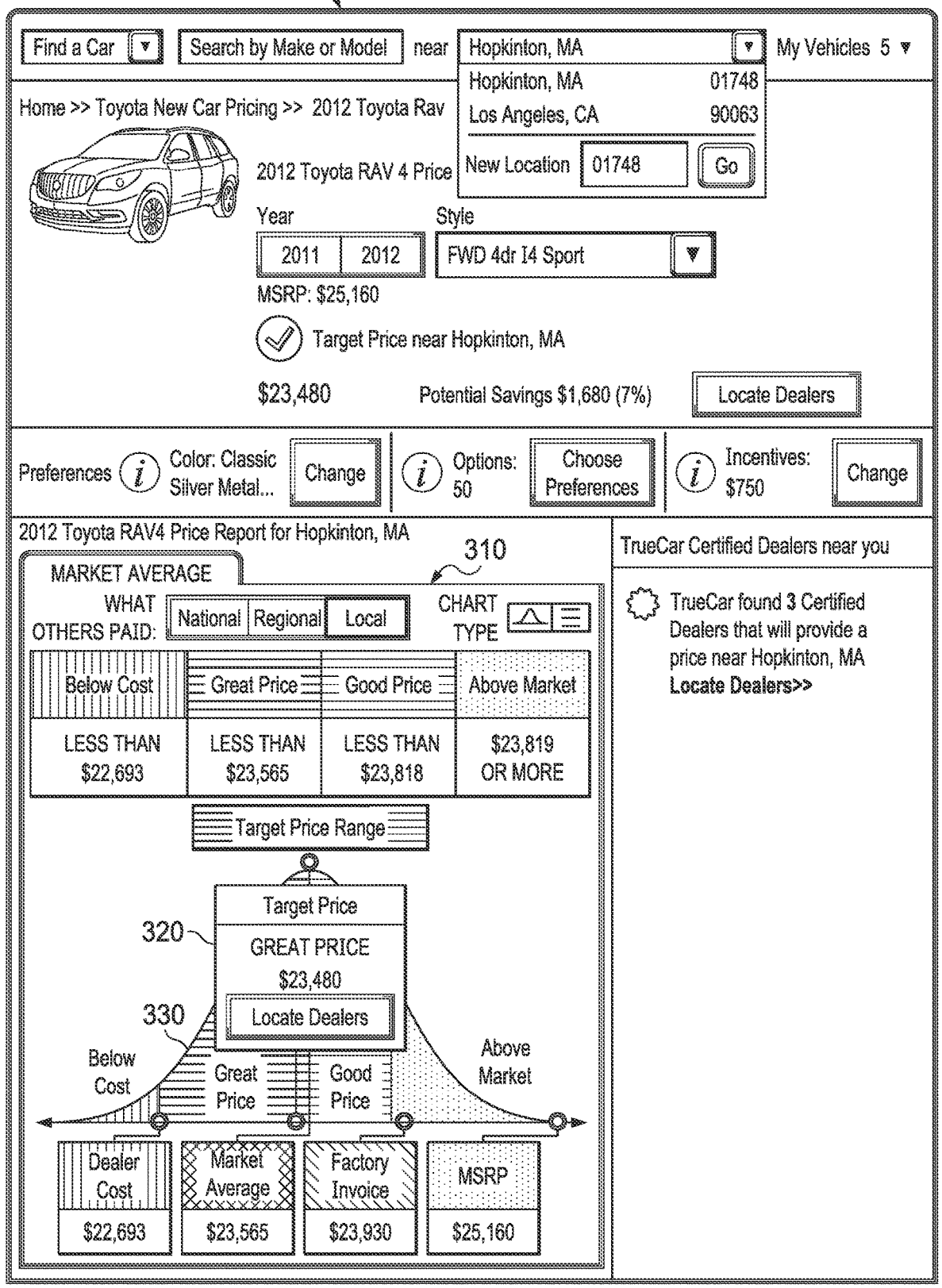
Figure 4:
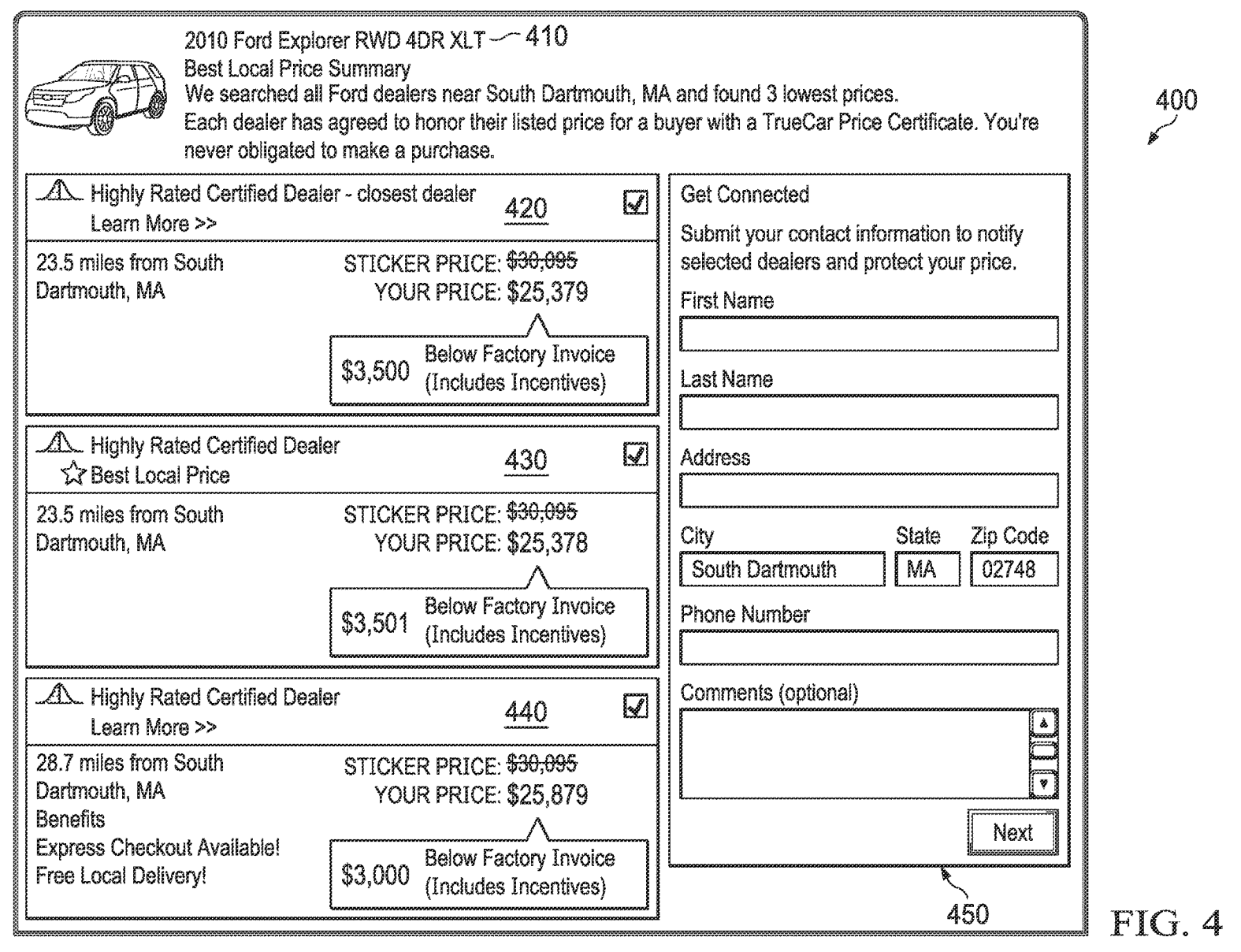

Using the TrueCar website, each user enters his/her ZIP Code and the desired make/model/options for the vehicle they are interested in pricing. In one embodiment, a DSA may be used to present a certain number (e.g., 3) of dealers that may offer up-front prices for those vehicles. Examples of the screens viewable by a user are shown in FIGS. 3-5.

This process of filtering a list of dealers can be extended to additionally benefit the dealers. The complementary action would be for vendors to apply a filter to a list of users who generated the online interest and focus their attention on those users (potential customers) who have the higher probabilities of buying the product. This filter could be used, for example, when the availability of a dealer's resources (e.g., sales persons, email responders, etc.) available to pursue interested users is insufficient to provide balanced attention to all the users for whom the vendor appeared in an online product search.

In some embodiments, data transformations may be used for variables with large variance or skewed distribution. Missing values may be imputed based on appropriate estimates such as using local average of historical data. Rescaled or additional derived variables can also be defined in order to reduce the variance of certain variables and increase the robustness of coefficient estimates. The final model coefficients may be chosen such that the resulting estimate probability of "stealing" or of completing a sale is consistent with the actual observed sales actions given the vendors displayed historically.

Embodiments of the systems and methods of the present invention may be better explained with reference to FIG. 1 which depicts one embodiment of a topology which may be used to implement embodiments of the systems and methods of the present invention. Topology 100 comprises a set of entities including vehicle data system 120 (also referred to herein as the TrueCar system) which is coupled through network 170 to computing devices 110 (e.g. computer systems, personal data assistants, kiosks, dedicated terminals, mobile telephones, smart phones, etc.,), and one or more computing devices at inventory companies 140, original equipment manufacturers (OEM) 150, sales data companies 160, financial institutions 182, external information sources 184, departments of motor vehicles (DMV) 180 and one or more associated point of sale locations, in this embodiment, computer systems 132 in car dealers 130. Network 170 may be for example, a wireless or wireline communication network such as the Internet or wide area network (WAN), publicly switched telephone network (PTSN) or any other type of electronic or non-electronic communication link such as mail, courier services or the like.

Vehicle data system 120 may comprise one or more computer systems with central processing units executing instructions embodied on one or more computer readable media where the instructions are configured to perform at least some of the functionality associated with embodiments of the present invention. These applications may include a vehicle data application 190 comprising one or more applications (instructions embodied on a computer readable media) configured to implement an interface module 192, data gathering module 194 and processing module 196 utilized by the vehicle data system 120. Furthermore, vehicle data system 120 may include data store 122 operable to store obtained data 124 such as dealer information, dealer inventory or dealer upfront pricing, data 126 determined during operation such as eligibility data, models 128 which may comprise a set of dealer scoring models, dealer cost model or price ratio models, or any other type of data associated with embodiments of the present invention or determined during the implementation of those embodiments.

Vehicle data system 120 may provide a wide degree of functionality including utilizing one or more interfaces 192 configured to for example, receive and respond to queries from users at computing devices 110 or dealer computer 132; interface with inventory companies 140, manufacturers 150, sales data companies 160, financial institutions 170, DMVs 180 or dealers 130 to obtain data; or provide data obtained, or determined, by vehicle data system 120 to any of inventory companies 140, manufacturers 150, sales data companies 160, financial institutions 182, DMVs 180, external data sources 184 or dealers 130. It will be understood that the particular interface 192 utilized in a given context may depend on the functionality being implemented by vehicle data system 120, the type of network 170 utilized to communicate with any particular entity, the type of data to be obtained or presented, the time interval at which data is obtained from the entities, the types of systems utilized at the various entities, etc. Thus, these interfaces may include, for example web pages, web services, a data entry or database application to which data can be entered or otherwise accessed by an operator, or almost any other type of interface which it is desired to utilize in a particular context.

In general, then, using these interfaces 192 vehicle data system 120 may obtain data from a variety of sources, including one or more of inventory companies 140, manufacturers 150, sales data companies 160, financial institutions 182, DMVs 180, external data sources 184 or computer systems 132 at dealers 130 and store such data in data store 122. This data may be then grouped, analyzed or otherwise processed by vehicle data system 120 to determine desired data 126 or models 128 which are also stored in data store 122.

A user at computing device 110 may access the vehicle data system 120 through the provided interfaces 192 and specify certain parameters, such as a desired vehicle configuration or incentive data the user wishes to apply, if any. The vehicle data system 120 can select a particular set of data in the data store 122 based on the user specified parameters, process the set of data using processing module 196 and models 128, generate interfaces using interface module 192 using the selected data set and data determined from the processing, and present these interfaces to the user at the user's computing device 110 or through dealer computers 132.

More specifically, in one embodiment interfaces 192 may visually present the selected data set to the user in a highly intuitive and useful manner. The visual interface may also include a set of selected dealers 130 selected for a vehicle and user location based on the likelihood of stealing a sale from a dealer closest to the user's location.

Turning to the various other entities in topology 100, dealer 130 may be a retail outlet for vehicles manufactured by one or more of OEMs 150. To track or otherwise manage sales, finance, parts, service, inventory and back office administration needs dealers 130 may employ a dealer management system (DMS) 132. Since many DMS 132 are Active Server Pages(ASP) based, transaction data 134 may be obtained directly from the DMS 132 with a "key" (for example, an ID and Password with set permissions within the DMS system 132) that enables data to be retrieved from the DMS system 132. Many dealers 130 may also have one or more websites which may be accessed over network 170, where pricing data pertinent to the dealer 130 may be presented on those websites, including any pre-determined, or upfront, pricing. This price is typically the "no haggle" (price with no negotiation) price and may be deemed a "fair" price by vehicle data system 120. Additionally, a vendor's current inventory may be obtained from a DMS 132 and associated with that dealer's information in data store 122.

A dealer 130 may also provide one or more upfront prices to operators of entity computing environment 120 (either over network 170, in some other electronic format or in some non-electronic format). Each of these upfront prices may be associated with a vehicle configuration such that a list of vehicle configurations and associated upfront prices may be associated with a dealer 130 in data store 122.

Inventory companies 140 may be one or more inventory polling companies, inventory management companies or listing aggregators which may obtain and store inventory data from one or more of dealers 130 (for example, obtaining such data from DMS 132). Inventory polling companies are typically commissioned by the dealer to pull data from a DMS 132 and format the data for use on websites and by other systems. Inventory management companies manually upload inventory information (photos, description, specifications) on behalf of the dealer. Listing aggregators get their data by "scraping" or "spidering" websites that display inventory content and receiving direct feeds from listing websites (for example, Autotrader, FordVehicles.com).

DMVs 180 may collectively include any type of government entity to which a user provides data related to a vehicle. For example, when a user purchases a vehicle it must be registered with the state (for example, DMV, Secretary of State, etc.) for tax and titling purposes. This data typically includes vehicle attributes (for example, model year, make, model, mileage, etc.) and sales transaction prices for tax purposes. Thus, data obtained 124 from the DMVs 180 may include vehicle registrations from dealers 130, including the dealer (or dealer location) from which a vehicle was purchased, the ZIP code or address of the consumer who purchased the vehicle, the date of the sales transaction, etc.

Financial institution 182 may be any entity such as a bank, savings and loan, credit union, etc. that provides any type of financial services to a participant involved in the purchase of a vehicle. For example, when a buyer purchases a vehicle they may utilize a loan from a financial institution, where the loan process usually requires two steps: applying for the loan and contracting the loan. These two steps may utilize vehicle and consumer information in order for the financial institution to properly assess and understand the risk profile of the loan. Typically, both the loan application and loan agreement include proposed and actual sales prices of the vehicle.

Sales data companies 160 may include any entities that collect any type of vehicle sales data. For example, syndicated sales data companies aggregate new and used sales transaction data from the DMS 132 systems of particular dealers 130. These companies may have formal agreements with dealers 130 that enable them to retrieve data from the dealer 130 in order to syndicate the collected data for the purposes of internal analysis or external purchase of the data by other data companies, dealers, and OEMs.

Manufacturers 150 are those entities which actually build the vehicles sold by dealers 130. In order to guide the pricing of their vehicles, the manufacturers 150 may provide an Invoice price and a Manufacturer's Suggested Retail Price (MSRP) for both vehicles and options for those vehicles—to be used as general guidelines for the dealer's cost and price. These fixed prices are set by the manufacturer and may vary slightly by geographic region.

External information sources 184 may comprise any number of other various source, online or otherwise, which may provide other types of desired data, for example data regarding vehicles, pricing, demographics, economic conditions, markets, locale(s), consumers, etc.

It should be noted here that not all of the various entities depicted in topology 100 are necessary, or even desired, in embodiments of the present invention, and that certain of the functionality described with respect to the entities depicted in topology 100 may be combined into a single entity or eliminated altogether. Additionally, in some embodiments other data sources not shown in topology 100 may be utilized. Topology 100 is therefore exemplary only and should in no way be taken as imposing any limitations on embodiments of the present invention.

Figure 2:
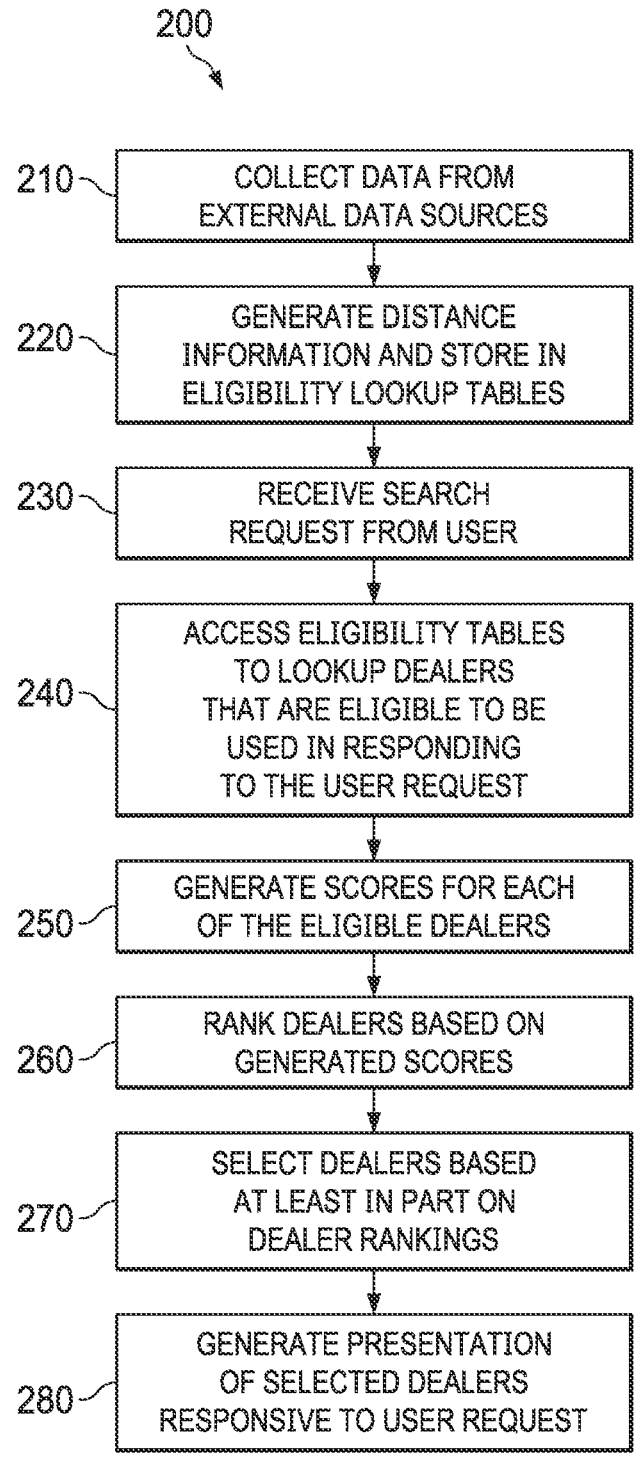
FIG. 2 is a flow diagram representing a method in accordance with one exemplary embodiment.

Referring to FIG. 2, a flow diagram illustrating a method (200) in accordance with one embodiment is shown. In this embodiment, data is collected from various external data sources such as inventory companies, manufacturers, sales data companies, DMVs, and the like, and is stored in data structures (e.g., tables) within the vehicle data system (210). The data may include market share for each dealer, inventory of vehicles maintained by each dealer, close rates associated with the respective dealers, prices of vehicles for each dealer, and locations of each dealer. The location information for the dealers is used to generate a distance lookup table which identifies the distances from each dealer to particular geographic regions (e.g., ZIP codes) (220). Lookup tables may also be created to store distances between the dealers themselves. These lookup tables are used in this embodiment as eligibility tables, as will be explained in more detail below.

When a user searches for a vehicle, a corresponding request is received by the vehicle data system (230) and the vehicle data system eligibility tables are accessed to determine which of the dealers are eligible to be used in generating a response to the user's search request (240). In one embodiment, eligibility is determined based on the distances between the respective dealers and the location of the user. For instance, if the user is located in a particular ZIP code, the distance lookup table may be used to identify dealers within a particular radius of the centroid of the ZIP code, or to identify the N closest dealers, where N is simply a desired number of dealers. If there are not a sufficient number of dealers within an initial region of interest, the region may be expanded to include more dealers. For example, if there are only two dealers within the ZIP code of the purchaser, the eligible dealers may be selected from the purchaser's ZIP code and the surrounding ZIP codes or an expanded area around the purchaser's ZIP code.

The eligibility tables are used to restrict the number of dealers that are used in the process of generating a response to the user request. This eliminates dealers that are not be likely to successfully close a sale to the user and thereby prevents processing resources, time, storage, etc. from being wasted on unnecessary computations and consideration of these dealers. For instance, it is highly unlikely that a purchaser will buy a vehicle from a first dealer that is located 100 miles away if there are several comparable dealers within 10 miles of the purchaser, so no value is gained by considering the first dealer or including the first dealer in a set of results that are presented to the purchaser. It should be noted that the eligibility of dealers for consideration in the response to the user's request may involve characteristics other than location. For example, eligibility may be restricted based on the dealers' respective market shares, inventories, close rates, prices, or other relevant characteristics. In one embodiment, the eligible dealers may include the top five dealers in each of the following categories: distance from the purchaser; market share; inventory; close rate; and price. Additionally, some dealers may elect not to be eligible for consideration in some cases. For instance, a dealer may elect not to be considered when the purchaser is more than 10 miles away.

After the set of eligible dealers has been selected, each of these dealers is scored (250). The score is an indication of the conditional probability that the dealer will make a sale to the user instead of the closest dealer if it is ultimately given the lead to the user (i.e., presented to the user responsive to the user request), provided a sale happens. In this embodiment, a binary choice logistic model is used to determine a score for each of the dealers. This logistic regression model is defined by a set of coefficients ($\beta_i$) and an intercept ($\beta_0$), where each of the coefficients corresponds to a particular feature. In one embodiment, the features include: distance from the purchaser; market share; inventory; close rate; and price. For each dealer, the closest dealer's values and the incumbent dealer's values for the features are multiplied by the corresponding coefficients and then summed with the intercept and plugged into a logistic function to produce the dealer's score. ("Incumbent" is used herein to refer to the dealer for which the score is being determined.) Generating scores only for the restricted set of eligible dealers, and not for all dealers that might have some small potential for a sale, increases the efficiency of the system.

The scoring model is trained using data collected on the features from the sources in the distributed computer network. All training data points are instances where TrueCar provided a set of dealers to a customer conducting to a sale. When training the model, the dependent variable for the linear regression model is a binary variable that indicates whether the sale went to the closest dealer or the incumbent dealer. By virtue of the structure of the logistic function, the choice can be transformed into a score reflective of the probability that the dealer (d) will make a sale instead of the closest dealer. The independent variables are the set of features ($x_i$). The training adjusts the weighting coefficients ($\beta_i$) of the scoring model as the collected data is applied to the model so that the score generated by the model most closely reflects the sales made by the dealers across the collected data.

After scores have been generated for each of the eligible dealers, these dealers are ranked (260). The ranking of the eligible dealers is then used to select one or more dealers that will be presented to the user (270). In one embodiment, the set of dealers that will be presented to the user includes the dealer that is closest to the user, and then one or more of the highest ranked dealers. For example, if it is desired to present the user with three dealers, the set would include the closest dealer (regardless of rank) and the two eligible dealers having the highest scores (other than the closest dealer, which may have one of the two highest scores). In alternative embodiments, the set of dealers to be presented to the user may include only ranked dealers, or other combinations of ranked and other dealers. When the set of dealers has been determined, a presentation of these dealers is generated and is presented to the user responsive to the user request (280).

This embodiment of the vehicle data system can improve the efficiency of the process and increases the likelihood of matching users to dealer based with a high likelihood of the user purchasing a vehicle from the dealer. This increased efficiency and likelihood of completing a sale is achieved by several factors. For example, the system limits the original pool of potential dealers that may be matched with the user by generating the eligibility tables and using these tables to select eligible dealers based on the location of the user. As a result of using the eligibility tables, the resources that are required to select the dealers that are ultimately presented to the user are reduced. No resources are wasted on dealers that are not eligible based on the data stored in these tables. Further, the vehicle data system builds a regression model for scoring the eligible dealers based on historical data that is collected from the external data sources and stores the weighting coefficients that define the model before a user request is received. Consequently, when the user request is received, the system simply retrieves the coefficients and scores the eligible dealers using these existing coefficients, so the scoring can be performed very quickly. Still further, the logistic model that is used to score the dealers is trained based on historical data, which provides a more accurate reflection of the likelihood of completing a sale than lone metrics such as the lowest price.

In one embodiment, the obtained data 124 or the determined data 126 may include a ZIP code or address for a set of vehicle dealers. These vehicle dealers may be all the dealers in a geographic area (such as nationally), or dealers 130 associated with a particular network of dealers (e.g., TrueCar dealer network) or both. Additionally, for every ZIP code the centroid (e.g., latitude and longitude) of the ZIP code may be stored. In particular, in one embodiment this data may be stored in a lookup table such that the distance from every dealer to any other dealer may be determined or the distance from any dealer to a ZIP code (e.g., the centroid of a ZIP code) may be determined.

More specifically, in one embodiment, data stored in data store 122 may include a set of dealers with corresponding dealer information such as the name and location of a dealer, makes sold by the dealer, etc. Data in data store 122 may also include an inventory list associated with each of the set of dealers which comprises the vehicle configurations currently in stock at each of the dealers. An upfront price for one or more makes and models of vehicle may also be stored in association with the dealer.

Using the obtained data 124 or the determined data 126 a dealer scoring model may be determined, trained and stored in data store 122 (e.g., in models 128). This dealer scoring model may, for example, be a logistic regression model including a set of coefficients for each of a set of features ($\beta_i$) and an intercept ($\beta_0$). The scoring model is trained using data collected on the features from the data sources (as described) in the distributed computer network, where the dependent variable for the linear regression model is a score reflective of the conditional probability that the dealer (d) will make a sale instead of the closest dealer if given the lead. The independent variables ($X_i$) represent the values for the set of features, and the coefficients ($\beta_i$) weight the features in the regression. The scoring model thus takes the form:

$$\left(1+\exp\left(-\sum_{i=1}^{n}\beta_i(X_i^{closest}-X_i^{contender})\right)\right)^{-1}$$

where i is an index of the dealer feature

In particular, in one embodiment, the features may include the price (e.g., the upfront price offered by a dealer for a make and model of vehicle), the market share of the dealer (e.g., the total sales of a given dealer relative to all sales of the same Make in the same area), the close rate of the dealer (e.g., the ratio of leads provided to the dealer to sales made from those leads), inventory counts for the dealer (e.g., at the make level) and the distance ranking of the dealer in a geographic area (e.g., the rank of distance to a geographic area of interest . . . is the dealer the closest dealer (1), the next closest dealer (2), etc.). Even more specifically, in certain embodiments or for certain features, the value for the feature may defined by the deltas (difference) between a value for the feature for a dealer in a geographic area (e.g., ZIP code) and the value for that feature for the closest dealer for that geographic area. The dealer scoring model can then be stored as a set of coefficient values ($\beta_i$) for each of the set of features and an intercept ($\beta_0$). For example:

| ScoringModelId | Intercept | Price | Marketshare | Close Rate | Inventory | Rank dist |
|---|---|---|---|---|---|---|
| 1 | −0.5757 | −0.00013 | 1.24 | 2.7 | 0.00142 | −0.0724 |
| 2 | | | | | | |

Additionally, a set of eligibility data structures (e.g., tables) may be determined and stored as the determined data 126. References herein to eligibility tables should be construed to include any type of eligibility data structure. In one particular embodiment, there may be an eligibility table determined and stored for each combination of vehicle make and geographic area (e.g., ZIP code). To determine an eligibility table for a make and a geographic area (e.g., ZIP code) all dealers who have made at least one sale (of the same make) in the geographic area during a past time period (e.g., week, month, quarter, year, unlimited time period, etc.) are determined. If there are at least a certain number of dealers (e.g., 5) at this point, the determination of eligible dealers for that geographic area may be complete. However, if there are not enough dealers based on sales of the same make in the geographic area, additional eligible dealers may be determined based on a dealer competition zone (DCZ) index value for each dealer which is associated with that ZIP code. The DCZ index value is a metric that represents the competitiveness of a corresponding dealer within the ZIP code. In one embodiment, a lower DCZ index value represents greater competitiveness.

A cutoff value for the DCZ index may be established, and all dealers having a DCZ index value (for the geographic area) that is under that cutoff value (i.e., the dealer is more competitive than a dealer having the threshold DCZ index value) may be selected. Alternatively, the dealers may be ranked based on their DCZ index values for the geographic area and a top number (e.g., 5) may be selected to supplement (or instead of) the dealers that made a sale in the geographic region. In this manner, DCZ index values may also serve as a cutoff if there are a large number of eligible dealers based on those dealers who have made sales in the geographic area. In this case, dealers may be ranked by DCZ index value and a top number (e.g., 20) may be selected. Alternatively, all dealers who have made a sale and who have a DCZ index value below (or above) a certain value may be selected as eligible dealers.

If there are at least a certain number of dealers (e.g., 5) after dealers are selected using DCZ index values, the determination of eligible dealers for that geographic area may be complete. However, if there are not at least a certain number of dealers based on sales of the same make in the geographic area and DCZ index value, a number of dealers may be determined based on drive distance from the geographic area. In particular, a number of dealers that are closest to the geographic area as measured by drive distance may be selected to supplement (or instead of) the dealers that made a sale in the geographic region or that were determined based on the DCZ index value.

In one embodiment, the set of eligible dealers may be determined according to values for certain of the features such as close rate (CR) or market share (MS). For instance, dealers may be separately ranked by market share, inventory, close rate and price, and the top N dealers in each of the categories may be determined to be eligible dealers (where N is some predetermined number that could vary by feature). For determining dealer eligibility, a Bayesian estimate of close rate may be utilized in association with actual leads for a dealer and dealer sales to that ZIP code—discounted by time. Raw market share data may be utilized for the dealer. A threshold may be set for close rate or market share for the ZIP code and make to determine the set of eligible dealers.

Once the number of eligible dealers for the geographic area and make are determined, values for each eligible dealer for each feature may be determined and associated with the dealer. In particular, in certain embodiments, a price for the make (e.g., as provided by the dealer) and the current inventory count for the make may be determined for the dealer and associated with the dealer. Additionally, the set of eligible dealers may be ranked based on drive distance from the geographic area and the ranking (with one being closest) associated with the dealer. A close rate reflecting a ratio of the number of leads provided to the dealer to the number of sales off those leads can also be determined for each of the eligible dealers. A market share for the dealer can also be determined, where the market share reflects the dealer's market share in the geographic area.

It may be useful here to discuss certain of these features and their determination in more detail. First with respect to close rate, the close rate may measure the ratio of leads given to a dealer to sales on those leads by the dealer over the most recent three months at the "closest dealer level". In order to have "mature" sales it may be desired to skip the past 30 days of sales data and utilize sales data from leads that occurred in the 3 months before the past 30 days (e.g., that between about 1 and 4 months old).

In order to determine meaningful and stable close rates for a dealer, however, it may be desirable to specify a minimum threshold number of leads or sales for the dealer. However, the more "local" these leads or sales are to the dealer of interest the more accurate they may be. Additionally, for new dealers there may not be enough information. Accordingly, a fallback logic may be implemented. In other words, sales and leads are aggregated according to each of an ordered set of criteria until a threshold number (e.g., 20) are obtained. For close rates, these criteria may be closest dealer, competition zone (CZ) and default. The default may be a mapping of DCZ values (or ranges) to close rates that may be stored in determined data 126. So, in one embodiment, for close rate (3 months of data are aggregated, starting from the $31^{st}$ most recent day) and evaluated according to the following ordered criteria:

1) Closest Dealer
   a. Definition: Based on the geographic region (e.g., ZIP code), find the same-make dealer closest (the "closest dealer") to that geographic region (e.g., ZIP code). Aggregate all leads and sales from all geographic regions (e.g., ZIP codes) that share the same closest dealer.
   b. Logic: Consumers from those ZIP codes will choose from the same set of dealers from a pure convenience/distance perspective.
   c. Cutoff: If >=20 leads from these ZIPs, then these values can be used to determine the close rate for the dealer of interest, else move to CZ.
2) CZ
   a. Definition: Based on the geographic region (e.g., ZIP code), find the close rate of all dealers who share the same CZ-label (e.g., Backyard, Competitive, or Conquest).
   b. Logic: Consumers will have the same basic distance decision. For example, consumers that are in Conquest zones will have the decision of go to this dealer or their Backyard dealer.
   c. Cutoff: If >=20 leads from all dealers sharing the same CZ-label, these values can be used to determine the close rate for the dealer of interest, else use the default values.
3) Default
   a. Definition: Use a mapping from the DCZ index value for the dealer to a Close Rate.
   b. Logic: Given no other information, the best prediction for close is the Dealer Competition Zone value.
   c. Cutoff: None.

To illustrate an example then, suppose that a determination of close rate is being made for "Toyota of Culver City" in the ZIP code 90401 which is a "competitive" zone for this dealer and the closest dealer for ZIP code 90401 is "Toyota of Santa Monica". Here the first step would be to determine the number of leads and sales for "Toyota of Culver City" in the region(s) where "Toyota of Santa Monica" is the closest dealer. If there are more than 20 leads then #sales/#leads can be used as the close rate for "Toyota of Culver City". Otherwise, all leads for dealers sharing the "Competition" label for ZIP code 90401. If there are more than 20 leads then #sales/#leads can be used as the close rate for "Toyota of Culver City". Otherwise, the DCZ index value for "Toyota of Culver City" can be used to find an associated close rate based on a mapping table and that close rate used as the close rate for "Toyota of Culver City".

Now with respect to market share, the market share may measure dealer market share in the geographic region (e.g., ZIP code). This can be determined from obtained data 124 from one or more sources. Data obtained from the most recent two years may be utilized in one embodiment. Again, in order to determine meaningful and stable close rates for a dealer, however, it may be desired to have over a threshold number of transactions (e.g., for the dealer or for the geographic region, e.g., ZIP code). Accordingly, a fallback logic for market share may also be implemented. In other words, transactions are determined according to each of an ordered set of criteria until a threshold number (e.g., 20) are obtained. For market share, these criteria may be geographic region (e.g., ZIP code), closest dealer, competition zone (CZ) and default. The default may be an average market share for the CZ zone and the make or a mapping of DCZ values (or ranges) of the dealer to close rates that may be stored (which may be stored in determined data 126). In one embodiment, market share is thus evaluated according to the following ordered criteria using the most recent 24 months of :

1. ZIP
   a. Definition: Use the market share for the dealer in the geographic region (e.g., ZIP code) directly.
   b. Logic: Most representative data.
   c. Cutoff: If >=20 same make Industry transactions, then use this value, else move to closest dealer.
2. Closest Dealer
   a. Definition: Based on the geographic region (e.g., ZIP code), find the same-make dealer closest to that geographic region (e.g., ZIP code). Aggregate all inventory sales from geographic region (e.g., ZIP codes) that share the same closest dealer.
   b. Logic: Consumers from those ZIP codes will choose from the same set of dealers from a pure convenience/distance perspective.
   c. Cutoff: If >=20 same make Industry transactions, then we use this value, else move to CZ.
3. CZ
   a. Definition: Based on the geographic region (e.g., ZIP code), find the market share of all dealers who share the same CZ-label (Backyard, Competitive, or Conquest).
   b. Logic: Consumers will have the same basic distance decision. For example, consumers that are in Conquest zones will have the decision of go to this dealer or their Backyard dealer.
   c. Cutoff: If >=same make Industry transactions, then we use this value, else move to default.
4. Default
   a. Definition: Use the mapping from DCZ index to Market Share.
   b. Logic: Given no other information, the best prediction for market share is the Dealer Competition Zone value.
   c. Cutoff: None.

To illustrate an example then, suppose that a determination of close rate is being made for "Toyota of Culver City" in the ZIP code 90401 which is a "competitive" zone for this dealer and the closest dealer for ZIP code 90401 is "Toyota of Santa Monica". Here, the first step would be to determine the number of transactions for "Toyota of Culver City" in the region itself (E.g., ZIP code 90401). If there are more than 20 transactions then the market share (e.g., #transactions for the dealer/#transactions for the ZIP code) can be used as the market share for "Toyota of Culver City". If there are not 20 transactions, the next step is to determine the number of transactions for "Toyota of Culver City" in the region(s) where "Toyota of Santa Monica" is the closest dealer. If there are more than 20 transactions then the market share (e.g., #transactions for the dealer/#transactions for the all these region(s)) can be used as the market share for "Toyota of Culver City". Otherwise, market share for "Toyota of Culver City" can be determined using transaction for all dealers sharing the "Competition" label for ZIP code 90401 if there are more than 20 transactions for these dealers. Otherwise the DCZ index value for "Toyota of Culver City" can be used to find an associated market rate based on a mapping table and that market rate used as the close rate for "Toyota of Culver City".

Turning now to inventory, to determine the inventory value for a dealer for a make in a geographic region, the number of distinct vehicle identification numbers (VIN) for the make is determined for each in day in the previous 14 weeks. The average of these numbers for days there was any inventory of that make can be used as the inventory for that dealer. In this manner dealers are not penalized if they are only active for some fraction of the time period (e.g., the 14 weeks).

In this manner, a set of eligibility structures (e.g., tables) may be generated for each geographic region, and these eligibility data structures may be stored as part of determined data 126. In particular, in one embodiment, there may be an eligibility table determined and stored for each combination of vehicle make and geographic area (e.g., ZIP code). Each eligibility table (e.g., for a make and geographic area) may include a set of dealers, where each dealer is associated with values for features including a price for the make, a current inventory count for the make, a distance ranking, a close rate, a market share for the dealer or any other desired values. It will be noted that one or more these values may be expressed relative to a baseline, such as the values for those features for the closest dealer (e.g., distance rank 1) in the geographic region. Moreover, it will be noted that as price may fluctuate or be changed by the dealer at their discretion, the price value may be determined (for the first time or updated) in real-time when needed. An example of a portion of an eligibility table could look like the following, for example:

| Dealer ID | Distance | Price | Marketshare | Close Rate | Inventory | Rank dist |
|---|---|---|---|---|---|---|
| 123 | 10 | −100 | 0.54 | 0.1 | 20 | 2 |
| 234 | 30 | 0 | 0.1 | 0.05 | 50 | 10 |

In one embodiment, the values for the features for each dealer may be truncated or capped. This truncation process may include providing a cap (e.g., maximum or minimum) value for a feature such that if the value for that feature for a particular dealer is over (or under) the cap, the value for the feature may be assigned the cap value. For example, for the feature of inventory if the value for a dealer is over 400 vehicles, the value for the inventory feature for that dealer may be assigned the value 400 (e.g., the cap value). For the distance ranking, the cap value may be a ranking of $20^{th}$ (e.g., if an eligible dealer for a make and ZIP code is ranked as greater than the $20^{th}$ dealer based on distance the dealer may be assigned a ranking of $20^{th}$). Similarly, the cap value for close rate may be 30% (e.g., if an eligible dealer for a make and ZIP code has a value for close rate greater than 30% the dealer may be assigned a close rate of 30%), while the cap value for market share may be 60% (e.g., if an eligible dealer for a make and ZIP code has a value for market share greater than 60% the dealer may be assigned a market share of 60%).

At some point then, a user at a computing device 110 may access vehicle data system 120 using one or more interface 192 such as a set of web pages provided by vehicle data system 120. Using this interface 192 a user may specify a vehicle configuration by defining values for a certain set of vehicle attributes (make, model, trim, power train, options, etc.) or other relevant information such as a geographical location. Information associated with the specified vehicle configuration may then be presented to the user through interface 192. This information may include pricing data corresponding to the specified vehicle and upfront pricing information or a list of dealers 130 based on the user's geographic location and a score determined for one or dealers based on the dealer scoring model stored in models 128 and the eligibility table associated with the user's geographic location.

Thus, one embodiment of a method for determine a set of dealers to present to a user may include determining a user's geographic region (e.g., ZIP code). This region may be provided expressly by the user or determined from other information (e.g., an IP address) and determining a make or model of vehicle of interest to the user. Once the geographic region of the user and a make and model of interest are determined, the eligibility structure (e.g., table) associated with the determined make and geographic region can be determined (from determined data 126). Additionally, the dealer scoring model (e.g., the coefficients for the set of features of the model and the intercept) may be accessed in models 128.

Each of the dealers in the eligibility table for the geographic region and make can then be scored based on the values for the dealer stored in the eligibility table and the coefficients for the dealer scoring model where the score of a dealer (d) is $Score_d = \sum_{i=1}^{n} \beta_i X_i$ where i=index of the feature, $\beta$ is the coefficent of the feature, and X is the value for the feature for the dealer (as stored in the elgibility table)

To continue with the above example, suppose the model is stored as

| ScoringModelId | Intercept | Price | Marketshare | Close Rate | Inventory | Rank dist |
|---|---|---|---|---|---|---|
| 1 | −0.5757 | −0.00013 | 1.24 | 2.7 | 0.00142 | −0.0724 |
| 2 | | | | | | |

Further suppose a portion of the eligibility table for a user's geographic region is as follows:

| Dealer ID | Distance | Price | Marketshare | Close Rate | Inventory | Rank dist |
|---|---|---|---|---|---|---|
| 123 | 10 | −100 | 0.54 | 0.1 | 20 | 2 |
| 234 | 30 | 0 | 0.1 | 0.05 | 50 | 10 |

Here, the application of the model to the dealers 123 and 234 would result in the following score:

| Dealer ID | Distance | Price | Marketshare | Close Rate | Inventory | Rank dist | Score |
|---|---|---|---|---|---|---|---|
| 123 | 10 | −100 | 0.54 | 0.1 | 20 | 2 | 0.8362 |
| 234 | 30 | 0 | 0.1 | 0.05 | 50 | 10 | −0.3940 |

Once the scores for each of the dealers of the eligibility table for the user's geographic region and desired make are determined, these scores can be used to determine the "likelihood of stealing" a sale from the closest dealer in the geographic region for each eligible dealer using the equation:

$$Lik_d = \frac{1}{1 + e^{-\beta_0 - (score_d - score_{closest})}}$$

where $\beta_0$ is the intercept of the model and $score_d$ and $score_{closest}$ are the core of dealer d and the closest dealer according to the dealer scoring model Continuing with the above example, suppose that the score of the closest dealer for the user's geographic region is 1.2386. In this case, the likelihood of stealing for dealer 234 can be determined as follows:

$$Lik_{234} = \frac{1}{1 + e^{-(-0.5757) - (-0.3940 - 0.8362)}}$$

Applying this same determination to the other dealer (123) would result in the following likelihood scores for each of the example dealers:

| Dealer ID | Distance | Price | Marketshare | Close Rate | Inventory | Rank dist | Score | Lik |
|---|---|---|---|---|---|---|---|---|
| 123 | 10 | −100 | .54 | 0.1 | 20 | 2 | 0.8362 | 0.3599 |
| 234 | 30 | 0 | 0.1 | 0.05 | 50 | 10 | −03940 | 0.1411 |

These likelihood scores can then be utilized by the vehicle data system to select both a number of dealers to present to the user and which dealers to present to the user. For example, the closest dealer plus the two dealers with the top likelihood scores may be selected for presentation to the user through an interface on a user device associated with the user. By presenting the one or more selected dealers to the user, only a subset of the original set may be presented to the user. Thus, by displaying only the dealers with the highest likelihood to complete a sale, a benefit to both users and vendors may simplify a customer's search time while increasing vendor's profits.

FIG. 3 depicts one embodiment of an interface 300 provided by the TrueCar system for the presentation of upfront pricing information 320 for a specified vehicle configuration to a user in conjunction with the presentation of pricing data for that vehicle configuration. Within interface 300 a user may be able to enter information related to a specific make and/or model for a vehicle. Within interface 300 the user may also enter geographic information such as a ZIP code associated with the user. In return, the TrueCar system may generate price report 310 and present same to the user via interface 300.

Price report 310 may comprise Gaussian curve 330 which illustrates a normalized distribution of pricing (for example, a normalized distribution of transaction prices). On the curve's X-axis, the average price paid may be displayed along with the determined dealer cost, invoice or sticker price to show these prices relevancy, and relation, to transaction prices. The determined "good," "great," "overpriced," etc. price ranges are also visually displayed under the displayed curve to enable the user to identify these ranges.

In addition, pricing information 320 may be displayed as a visual indicator on the x-axis such that a user may see where this pricing information 320 falls in relation to the other presented prices or price ranges within the geographic region.

FIG. 4 depicts an embodiment of an interface 400 for the presentation of dealer information associated with pricing information. Interface 400 may be representative of the top three dealers, and may include display elements 420, 430, 440 for each of these dealers, where each display element includes information for a specific make and model of a vehicle 410 (2010 Ford Explorer RWD 4DR XLT near ZIP code 02748). Interface 400 is presented in response to the user clicking a "locate dealer" button, which submits a user request to the system identifying a location associated with the user (e.g., a zip code) and characteristics of the vehicle of interest. For each dealer, interface 400 may comprise dealer information, pricing data, vehicle configuration data, and instructions for obtaining an offered upfront price from the dealer for a specific make and model of a vehicle 410.

Based in part of the make and model of the vehicle 410, interface 400 may present a user who is interested in purchasing vehicle 410 with one or more dealers 410, 420, 430. The one or more dealers 410, 420, 430 may be determined and/or selected based in part on the likelihood score as discussed.

Interface 400 may also include forms 450 where a user may enter personal information such as a name, address, and contact information of the user. The personal information of the user may be used to more accurately or efficiently determine the probability of a dealer closing a sale.

Referring to FIG. 5, upon entering personal information, the identities of the selected (using, at least in part, an embodiment of a DSA) dealers 510, 520, 530 are displayed or presented to the potential customer via interface 500 along with the price guarantee and any dealer perks (note that Colonial Ford has two perks listed: free local delivery and express checkout).

FIG. 6 depicts another example of how a consumer may interact with an embodiment implementing the DSA disclosed herein through a user interface on a client device. Webpage 600 may include forms 610 associated with customer information that may be entered or completed by a user. Webpage 600 may also include elements 620 identifying the closest dealers (e.g., TrueCar certified dealers) to the potential customer, and a target price for a specific trim of a vehicle in a geographic region.

It should be understood that the illustrations and explanations herein are provided by way of example and that any limiting language such as must, should, requires, etc. should not be taken as limitations on embodiments generally.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the otherwise.

What is claimed is:

1. A method comprising:
storing, in a memory of a vehicle data system embodied in a first computing device prior to receiving an electronic user request, an eligibility table which identifies, for each of a plurality of combinations of location and vehicle make, a corresponding set of eligible dealers;
generating, by the vehicle data system, a set of weighting coefficients $\beta\_i$, where i is an index of dealer features, $\beta\_i$ is a weighting coefficient for an $i^{th}$ feature and storing, in the memory of the vehicle data system prior to receiving the user request, the set of weighting coefficients $\beta\_i$;
generating, by the vehicle data system, a user interface and providing the user interface to a second computing device that is connected to the first computing device by a distributed computer network, wherein the user interface is adapted to enable input of the user request to the vehicle data system, the user request designating one or more vehicle characteristics and identifying a user location;

receiving, by the vehicle data system from the second computing device, the user request;

retrieving, by the vehicle data system from the eligibility table, a first set of eligible dealers corresponding to the location identified by the user request;

for each of the dealers in the first set of eligible dealers, determining, by the vehicle data system, a corresponding likelihood score using the set of weighting coefficients;

selecting, by the vehicle data system, at least a portion of the dealers in the first set of eligible dealers based on the corresponding likelihood scores, and further selecting a closest one of the dealers in the first set of eligible dealers; and generating, by the vehicle data system, a presentation for the user interface including a corresponding display element for each of the selected dealers, and providing the presentation to the second computing device via the distributed computer network to update the user interface.

2. A vehicle data system for generating an update to a user interface, the comprising:

a first computing device having a processor and a computer readable storage medium;

wherein the first computing device is adapted to communicate with a second computing device connected to the first computing device by a distributed computer network;

wherein the first computing device is adapted to receive data from one or more external data sources connected to the first computing device by the distributed computer network;

wherein the computer readable storage medium of the first computing device stores one or more instructions executable by the processor to perform:

storing, in a memory of a vehicle data system embodied in a first computing device prior to receiving an electronic user request, an eligibility table which identifies, for each of a plurality of combinations of location and vehicle make, a corresponding set of eligible dealers;

generating, by the vehicle data system, a set of weighting coefficients $\beta\_i$, where i is an index of dealer features, $\beta\_i$ is a weighting coefficient for an ith feature and storing, in the memory of the vehicle data system prior to receiving the user request, the set of weighting coefficients $\beta\_i$;

generating, by the vehicle data system, a user interface and providing the user interface to a second computing device that is connected to the first computing device by a distributed computer network, wherein the user interface is adapted to enable input of the user request to the vehicle data system, the user request designating one or more vehicle characteristics and identifying a user location;

receiving, by the vehicle data system from the second computing device, the user request;

retrieving, by the vehicle data system from the eligibility table, a first set of eligible dealers corresponding to the location identified by the user request;

for each of the dealers in the first set of eligible dealers, determining, by the vehicle data system, a corresponding likelihood score using the set of weighting coefficients;

selecting, by the vehicle data system, at least a portion of the dealers in the first set of eligible dealers based on the corresponding likelihood scores, and further selecting a closest one of the dealers in the first set of eligible dealers; and generating, by the vehicle data system, a presentation for the user interface including a corresponding display element for each of the selected dealers, and providing the presentation to the second computing device via the distributed computer network to update the user interface.

3. The vehicle data system of claim 2, wherein the likelihood score is calculated as a logistic value of a difference between a first value for a closest dealer and a second value for an incumbent dealer, wherein each of the first and second values is calculated as a linear combination of a set of features including market share, inventory, close rate, price and distance, the linear combination of the set of features comprising a weighted sum $\Sigma\_(i=1)^n \beta\_i X\_i$, where i is an index of the dealer features, $\beta\_i$ is a weighting coefficient for an $i^{th}$ feature, and $X\_i$ is a value for the $i^{th}$ feature.

4. The vehicle data system of claim 3, wherein the instructions are further executable by the processor to collect dealer location data and historical vehicle sales transaction data from the one or more external data sources that are connected to the first computing device by the distributed computer network prior to receiving the user request.

5. The vehicle data system of claim 4, wherein the instructions are executable by the processor to generate the weighting coefficients based on the data collected from the one or more external data sources.

6. The vehicle data system of claim 2, wherein the instructions are further executable by the processor to collect dealer location data and historical vehicle sales transaction data from the one or more external data sources that are connected to the first computing device by the distributed computer network, and wherein the likelihood score corresponding to each eligible dealer is determined based at least in part on the collected data.

7. The vehicle data system of claim 4, wherein the set of eligible vehicle dealers corresponding to each combination comprises one or more dealers that sell the corresponding make of vehicle and are located within a predetermined distance of the corresponding geographical location.

8. The vehicle data system of claim 4, wherein the set of eligible vehicle dealers corresponding to each combination includes dealers that sell the corresponding make of vehicle and are one of N most highly ranked dealers in one or more a set of categories, where N is a predetermined number and wherein the set of categories include market share, inventory, close rate and price.

9. The vehicle data system of claim 2, wherein determining the set of eligible dealers corresponding to the user request comprises:

retrieving from the eligibility table a preliminary set of eligible dealers corresponding to the user location identified by the user request;

determining whether the preliminary set of eligible dealers includes at least a threshold number of dealers;

if the preliminary set of eligible dealers includes at least the threshold number of dealers, using the preliminary set of eligible dealers as the first set of eligible dealers; and if the preliminary set of eligible dealers includes less than the threshold number of dealers, retrieving from the eligibility table an expanded set of eligible dealers corresponding to the location identified by the user request and one or more additional locations, wherein the additional locations comprise locations which are in a common competition zone with the location identified by the user request.

10. The vehicle data system of claim 2, wherein the instructions are executable by the processor to collect dealer location data and historical vehicle sales transaction data from the one or more external data sources that are connected to the first computing device by the distributed computer network, and wherein the eligibility table is generated based at least in part on the collected data.

11. The vehicle data system of claim 2, wherein the presentation for the user interface further includes a display element corresponding to one of the dealers in the first set of eligible dealers which is closest to the user location identified by the user request, regardless of the corresponding likelihood score.

12. A computer program product comprising at least one non-transitory computer readable medium storing instructions translatable by a computing device embodying a vehicle data system to perform:
storing, in a memory of a vehicle data system embodied in a first computing device prior to receiving an electronic user request, an eligibility table which identifies, for each of a plurality of combinations of location and vehicle make, a corresponding set of eligible dealers;
generating, by the vehicle data system, a set of weighting coefficients $\beta\_i$, where i is an index of dealer features, $\beta\_i$ is a weighting coefficient for an ith feature and storing, in the memory of the vehicle data system prior to receiving the user request, the set of weighting coefficients $\beta\_i$;
generating, by the vehicle data system, a user interface and providing the user interface to a second computing device that is connected to the first computing device by a distributed computer network, wherein the user interface is adapted to enable input of the user request to the vehicle data system, the user request designating one or more vehicle characteristics and identifying a user location;
receiving, by the vehicle data system from the second computing device, the user request;
retrieving, by the vehicle data system from the eligibility table, a first set of eligible dealers corresponding to the location identified by the user request;
for each of the dealers in the first set of eligible dealers, determining, by the vehicle data system, a corresponding likelihood score using the set of weighting coefficients;
selecting, by the vehicle data system, at least a portion of the dealers in the first set of eligible dealers based on the corresponding likelihood scores, and further selecting a closest one of the dealers in the first set of eligible dealers; and
generating, by the vehicle data system, a presentation for the user interface including a corresponding display element for each of the selected dealers, and providing the presentation to the second computing device via the distributed computer network to update the user interface.

13. The computer program product of claim 12, wherein the likelihood score is calculated as a logistic value of a difference between a first value for a closest dealer and a second value for an incumbent dealer, wherein each of the first and second values is calculated as a linear combination of a set of features including market share, inventory, close rate, price and distance, the linear combination of the set of features comprising a weighted sum $\Sigma\_(i=1)^n \beta\_i X\_i$, where i is an index of the dealer features, $\beta i\_$ is a weighting coefficient for an ith feature, and $X\_i$ is a value for the $i^{th}$ feature.

14. The computer program product of claim 13, wherein the instructions are further executable by the processor to collect dealer location data and historical vehicle sales transaction data from the one or more external data sources that are connected to the first computing device by the distributed computer network prior to receiving the user request.

15. The computer program product of claim 12, wherein the instructions are further executable by the processor to collect dealer location data and historical vehicle sales transaction data from the one or more external data sources that are connected to the first computing device by the distributed computer network, and wherein the likelihood score corresponding to each eligible dealer is determined based at least in part on the collected data.

16. The computer program product of claim 14, wherein the set of eligible vehicle dealers corresponding to each combination comprises one or more dealers that sell the corresponding make of vehicle and are located within a predetermined distance of the corresponding geographical location.

17. The computer program product of claim 14, wherein the set of eligible vehicle dealers corresponding to each combination includes dealers that sell the corresponding make of vehicle and are one of N most highly ranked dealers in one or more a set of categories, where N is a predetermined number and wherein the set of categories include market share, inventory, close rate and price.

18. The computer program product of claim 12, wherein determining the set of eligible dealers corresponding to the user request comprises:
retrieving from the eligibility table a preliminary set of eligible dealers corresponding to the user location identified by the user request;
determining whether the preliminary set of eligible dealers includes at least a threshold number of dealers;
if the preliminary set of eligible dealers includes at least the threshold number of dealers, using the preliminary set of eligible dealers as the first set of eligible dealers; and
if the preliminary set of eligible dealers includes less than the threshold number of dealers, retrieving from the eligibility table an expanded set of eligible dealers corresponding to the location identified by the user request and one or more additional locations, wherein the additional locations comprise locations which are in a common competition zone with the location identified by the user request.

19. The computer program product of claim 12, wherein the instructions are executable by the processor to collect dealer location data and historical vehicle sales transaction data from the one or more external data sources that are connected to the first computing device by the distributed computer network, and wherein the eligibility table is generated based at least in part on the collected data.

20. The computer program product of claim 12, wherein the presentation for the user interface further includes a display element corresponding to one of the dealers in the first set of eligible dealers which is closest to the user location identified by the user request, regardless of the corresponding dealer score.

* * * * *